United States Patent

Dunn

[15] 3,674,720
[45] July 4, 1972

[54] PROCESS FOR MIXING COREACTIVE LIQUIDS WHICH FORM POLYURETHANES

[72] Inventor: Donald Dunn, Cincinnati, Ohio

[73] Assignee: The Cincinnati Milling Machine Company, Cincinnati, Ohio

[22] Filed: Nov. 19, 1969

[21] Appl. No.: 878,081

[52] U.S. Cl. .................... 260/2.5 BC, 259/1.7, 260/2.5 BD, 260/75 NE, 260/77.5 AA
[51] Int. Cl. ................... C08g 22/04, C08g 22/44, B01f 7/32
[58] Field of Search ................ 260/2.5 BD, 77.5 AA, 75 NE, 260/2.5 BC; 259/7

[56] References Cited

UNITED STATES PATENTS

| | | | |
|---|---|---|---|
| 3,362,919 | 1/1968 | Rood | 260/2.5 X |
| 2,788,953 | 4/1957 | Schneider | 260/2.5 X |

FOREIGN PATENTS OR APPLICATIONS

| | | | |
|---|---|---|---|
| 904,003 | 8/1962 | Great Britain | 260/2.5 A X |
| 839,183 | 6/1960 | Great Britain | 260/2.5 A X |

*Primary Examiner*—Donald E. Czaja
*Assistant Examiner*—C. Warren Ivy
*Attorney*—Plumley and Tyner

[57] ABSTRACT

A process and apparatus for intimately mixing two or more mutually coreactive liquids such as polyols and polyisocyanates comprising:

A. passing the liquids, while in a substantially unmixed state, through a plurality of very small holes such as that provided by a screen, and immediately thereafter B. subjecting the liquids to a high shear.

The present process and apparatus find particular utility in the production of high density, foamed polyurethane moldings.

12 Claims, 1 Drawing Figure

PATENTED JUL 4 1972
3,674,720
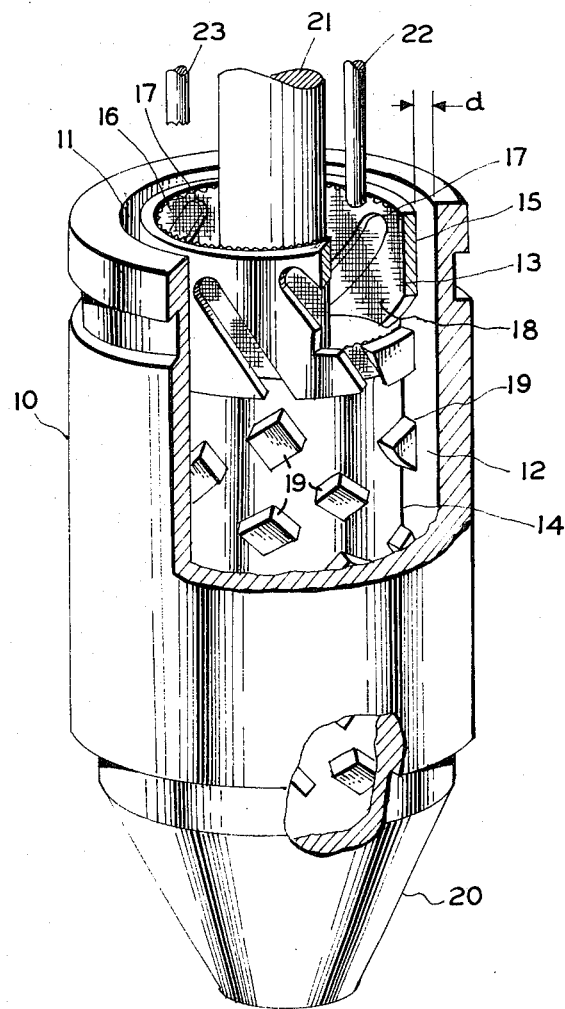
INVENTOR
DONALD DUNN
BY Plumley & Tyner
ATTORNEYS

PROCESS FOR MIXING COREACTIVE LIQUIDS WHICH FORM POLYURETHANES

It is well-known in the art to intimately mix two mutually coreactive liquids, at least one of which is very viscous, by subjecting them to high shear in devices such as rotating mixers or centrifugal pumps. Examples of mutually coreactive liquids are polyols and polyisocyanates employed to produce rigid and flexible foamed polyurethane moldings.

Mixing equipment for the preparation of polyurethane foam can usually be divided into two general categories. The first category includes equipment which employs high pressures (800 psi or more) to deliver the separate reactive liquid components to a mixing chamber at the desired weight ratio, where optionally under the influence of a stationary helical type member they are mixed and subsequently discharged from the mixing chamber. The use of this high pressure equipment is limited by the viscosity of the reactive liquid components which can be pumped by the high pressure positive displacement fuel injection type pumps. Viscosities of 1,000 cps or less are required for this high pressure type equipment. Such viscosities are typical of the reactive liquid components used to obtain low density (2.0 lb/ft$^3$) polyurethane foam. The second category includes equipment which uses low pressures (less than 400 psi) to deliver the separate reactive liquid components to the mixing chamber at the desired weight ratio where under the influence of a high velocity, high shear, rotating impeller they are mixed and subsequently continuously discharged from the mixing chamber. This low pressure type equipment is capable of pumping liquids having a much higher viscosity than those capable of being pumped in the high pressure type equipment. Liquids having viscosities of several thousand centipoises can be readily pumped in the low pressure type equipment.

Both low and high pressure type equipment often adequately mix low viscosity reactive liquid components used for preparing low density polyurethane foam. Even in the preparation of higher density free blown foam (e.g., 5 lbs/ft$^3$) adequate mixing of the relatively higher viscosity liquid components is often achieved with the low pressure type equipment. It has been found, however, that the low pressure type equipment often provides poor mixing of the high viscosity reactive liquid components used to prepare high density rigid foam moldings as evidenced by uneven surface or internal color; non-uniform cell size within the surface, skin, and core of the molding; an undesirably broad range of cell size distribution; and an undesirably non-uniform cell separation.

It is, therefore, an object of the present invention to provide a novel mixing process and apparatus substantially free of one or more of the disadvantages of the prior art.

Another object is to provide a novel process and apparatus for intimately mixing two mutually coreactive liquids and especially viscous liquids.

A further object is to provide a novel process for forming a polyol-polyisocyanate mixture which can be used to produce foamed polyurethane moldings having a uniform surface and internal color; a uniform cell size within the surface, skin, and core of the molding; a narrow range of cell size distribution within the surface, skin, and core; and uniform cell separation. Additional objects and advantages will be apparent by the following detailed description of the present invention.

According to the present invention, it has been discovered that two mutually coreactive liquids such as polyols and polyisocyanates can be intimately mixed by passing the liquids through a plurality of very small holes and then subjecting the resultant mixture to a high shear.

The invention may be better understood by reference to the single FIGURE of the drawing wherein there is shown a partially cut-away isometric view of a preferred mixer of the present invention.

The mixer comprises a housing 10 having therein a cylindrical chamber 11. A rotor 12 is rotatably mounted within the chamber 11 separated from the inside wall of the housing 10 by a distance, $d$, typically 0.010 to 0.030 inch. The rotor 12 has a basket portion 13 and an impeller portion 14. The basket portion 13 of the rotor 12 has vertically disposed sides 15 defining a cavity 16. The sides 15 are provided with a plurality of slots 17. The slots 17 can have any shape but in the embodiment shown have a length greater than three times the width (e.g., 1-¼ × 3/16 inches). A screen 18 fits into the cavity 16 and rests on the bottom thereof and in contact with the inside surface of the sides 15. A drive shaft 21, driven by any suitable means not shown, is fixedly attached to the rotor 12. The impeller portion 14 of the rotor 12 comprises a plurality of diamond shaped projections 19. The downstream or lower portion of the housing 10 is in the shape of a funnel 20. The polyisocyanate is supplied to the inside of the screen 18 by conduit 22 and the polyol is supplied by conduit 23. The impeller portion 14 of the rotor 12 can have other well-known configurations such as those known in the art as a standard spiral, banded spiral, or slotted spiral.

In operation the shaft 21 is rotated causing rotation of the rotor 12 within the housing 10. The polyol optionally containing a blowing agent and the polyisocyanate are fed from reservoirs through conduit 22 and 23 at the desired stoichiometric ratio and flow rate into the cavity 16. Due to the speed of rotation of the rotor 12, the polyol and the polyisocyanate are forced through the holes in the screen 18 under the influence of centrifugal force. Some mixing may occur in the cavity 16 and the resulting partially mixed polyol and polyisocyanate then pass through the screen 18 into a shear mixing zone formed by the inside wall of the chamber 11 and the outside wall of the basket portion 13. As the polyolpolyisocyanate mixture comes into contact with the impeller portion 14 of the rotor 12, additional high shear mixing occurs with the mixture finally being discharged from the housing 10 through the funnel 20 prior to gelation. The mixture is then directed to molds not shown where the mixture cures to a rigid or flexible polyurethane molding. When the mixture contains a blowing agent, a polyurethane foam is produced.

The holes through which the polyol and polyisocyanate pass can have a maximum cross-sectional dimension of 0.001 to 0.033 inch and preferably from 0.0059 to 0.20 inch. Thus, when the holes are provided in the form of drilled passages in the sides 15 of the basket portion 13 replacing the slots 17, these holes have diameters within the above-described limits. In the preferred embodiment of the invention shown in the drawing wherein the holes are provided by the spaces between the wires of a woven screen, meshes of 20 to 400 and preferably 32 to 200 mesh per inch are preferred. The sum of the areas of the individual holes is at least great enough to permit the desired throughput of the mixture without creating an excessive pressure drop through the holes.

While the apparatus of the present invention intimately mixes liquids of a wide variety of viscosities, it is especially useful for mixing liquids at least one of which has a viscosity of over 1,000 cps at the mixing temperature. Such liquids are frequently employed in the production of high density (e.g., 5 lbs/ft$^3$) polyurethane foam moldings.

Organic polyisocyanates or mixtures of organic polyisocyanates, in their liquid state, which are applicable in the practice of this invention include, but are not limited to:

2, 4-Tolylene diisocyanate
2, 6-Tolylene diisocyanate
4, 4'-Diphenylmethane diisocyanate
1, 6-Hexamethylene diisocyanate
Mixtures of 2, 4- and 2, 6-Tolylene diisocyanates
Xylylene diisocyanate
3, 3'-Bitolylene-4, 4'-diisocyanate
Polymethylene polyphenyl isocyanate
Trans vinylene diisocyanate
3, 3'-Dimethoxy-4, 4'-diphenylene diisocyanate
Hydrogenated 4, 4'-diphenyl methane diisocyanate.

Isocyanate-terminated reaction products, commonly known as prepolymers, obtained by reacting a stoichiometric excess of an organic polyisocyanate or mixture of organic polyisocyanates with an organic polyhydroxy compound or mixture of organic polyhydroxy compounds are also applicable in the practice of this invention.

The organic polyhydroxy compounds or mixtures of organic polyhydroxy compounds, commonly used in the polyurethane art, which may be employed in the practice of this invention include, but are not limited to:

1. Poly(oxyalkylene derivatives of glycerine, sorbitol, α-methyl glucoside, sucrose, trimethylol propane, pentaerythritol, starch or like alkyl, aryl, aryl-alkyl, cyclic or heterocyclic polyhydric alcohols.
2. Hydroxy terminated reaction products obtained by reacting polycarboxylic acids with polyhydric alcohols (e.g., hydroxy terminated reaction product of the reaction of ethylene glycol with adipic acid).
3. Poly(oxyalkylene)diols (e.g., poly(oxypropylene) diols, poly(oxyethylene)diols and poly(oxybutylene)diols).
4. Organic polyhydric alcohols (e.g. glycerine, 1, 6-hexane diol, ethylene glycol, neopentyl glycol and trimethlol propane.
5. Mixtures containing poly(oxyalkylene) derivatives of polyhydric alcohol and polyoxyalkylene diols or polyhydric alcohols (e.g., poly(oxypropylated) α-methyl glucoside admixed with a poly(oxypropylene)diol).
6. Mixtures of polyoxyalkylated polyhydric alcohols.
7. Poly(oxyalkylene) derivatives of polyhydric alcohols admixed with the hydroxy terminated reaction products obtained by reacting polycarboxylic acids with a polyhydric alcohols (e.g., polyoxypropylated glycerine admixed with the hydroxy terminated reaction product of the reaction of ethylene glycol with adipic acid).

Admixtures of organic polyisocyanates, isocyanate-terminated prepolymers or organic polyhydroxy compounds with any or all of the following may also be employed in the practice of this invention:

blowing agents
surfactants
catalysts
fillers
pigments
fire retardant additives
U.V. stabilizers
antioxidants.

The following non-limited examples wherein all parts and percentages are by weight further illustrate the present invention.

EXAMPLE 1

This control example illustrates the undesirable results obtained by certain prior art procedures.

A polyisocyanate composition at about 102° F having a free isocyanate content of 25.3 percent by weight and a viscosity of 5,350 cps at 72° F prepared by reacting 11.7 parts by weight of Voranol P400 (a poly(oxypropylene) diol having an average molecular weight of about 400 and a hydroxyl number of about 270.3, obtainable from the Dow Chemical Co.) with 88.3 parts by weight of Mondur MR (a polyisocyanate having a free isocyanate content of 31.56 percent by weight obtainable from the Mobay Chemical Co.) and a polyol mixture at about 71° F comprising 83.9 parts by weight of Poly G–435DM (a propylene oxide-methyl glucoside adduct, propylene oxide-glycerine adduct mixture having a hydroxyl number of 439.6, obtainable from the Olin Mathieson Chemical Co.), 12.32 parts by weight of monofluorotrichloromethane, 1.5 parts by weight of Dow Corning 193 surfactant (a silicone-glycol copolymer obtainable from the Dow Corning Corp.), 0.6 parts by weight of N, N, N′, N′ tetramethyl-1,3 butane diamine, and 1.68 parts by weight of difluorodichloromethane at 53.5/46.5 polyisocyanate composition/polyol mixture ratio by weight were injected into the mixing chamber of a Martin Sweets foam machine (Model VII pumping and metering unit, Model VMD–325 mixing head, and Model DD–21 mixing head drive) by means of constant displacement pumps operating at a combined output of 27.2 lbs./min. The liquid continuously discharged from the mixing chamber was passed into a closed aluminum mold having a 166 in³ cavity, a mold temperature of about 142° F or into a 32 oz. paper container. The approximately 900 gms. of material passed into the mold, was permitted to foam and cure whereupon the resultant molded foam article was removed. The liquid which passed into the 32 oz. paper container was allowed to foam and the resultant foam examined. The Martin Sweets mixing chamber operating at an impeller speed of about 4,900 rpm comprised (1) a rotating cylindrical member, known as the impeller, having a plurality of diamond shaped projections equally distributed over the external periphery and covering approximately 70 percent of the length of the rotating cylindrical member and an upper section covering approximately 30 percent of the length of the rotating cylindrical member which is machined so as to form a cavity having a plurality of elongated openings (i.e., openings having a length many times the width) at the periphery, said openings having their long axis oriented at about 30°–45° to the long axis of the cylindrical member, and (2) a stationary tubular housing entirely covering the rotating cylindrical member in a manner such that the stationary tubular housing and the rotating cylindrical member (impeller) are separated by a small distance, about 0.010 inch. At one end of the tubular housing was fastened a conically shaped member having a ¾-inch diameter opening at its apex. An essentially light brown cured foam molding was obtained which exhibited non-uniform surface and internal color (i.e., the surface and interior portions of the foam molding both contained numerous dark brown isocyanate rich-looking regions of random size and shape distributed in a random manner). The molding exhibited a non-uniform cell structure at the surface and interior, with respect to cell size and distribution of cell sizes. The light brown regions of the molding contained a relatively narrow distribution of relatively small cells while the dark brown regions exhibited a rather wide distribution of cell sizes (i.e., some cells were quite large, being larger than the cells in the light brown regions and some cells were quite small, being much smaller than the cells in the light brown regions).

The free blown foam also exhibited considerable variation in color and cell structure. Regions of significantly darker color were randomly distributed throughout the body of the foam. These darker colored isocyanate rich-looking regions contained a wide distribution of cell sizes, some cells being rather large while other cells appeared relatively small. On the other hand, the lighter colored regions exhibited a relatively narrow distribution of cell sizes.

EXAMPLE 2

This example is illustrative of the present invention.

The polyisocyanate composition described in Example 1 at 103° F and the polyol mixture described in Example 1 at 72° F were injected into the mixing chamber of the Martin Sweets foam machine described in Example 1, which was modified by placing a 32 mesh per inch wire screen at the internal periphery of the cavity of the upper section of the impeller, at a polyisocyanate composition/polyol mixture ratio of 53.5/46.5 by weight using two constant displacement pumps operating at a combined output of 27.2 lbs/min. The 32 mesh wire screen covered the elongated openings in the cavity section of the impeller of Example 1. An impeller speed of 4,900 rpm was used and the liquid being continuously discharged from the mixing chamber was passed into the closed aluminum mold of Example 1 at a mold temperature of 140° F or into a 32 oz. paper container. The approximately 900 grams of materials in the aluminum mold was permitted to foam and resultant cured molded foam article was removed and examined. The material in the 32 oz. paper container was permitted to free blow and set whereupon it was examined.

The molded foam article exhibited an improved uniformity of color on the surface as compared to the surface of the foam molding of Example 1. Cell structure uniformity on the surface of the foam molding of Example 2 was greater than the cell structure uniformity on the surface of the foam molding of Example 1 (i.e., the distribution of cell sizes on the surface of the foam molding of Example 2 was narrower than the distribution of cell sizes on the surface of the foam molding of Example 1). The interior of the molding of Example 2 exhibited a relatively uniform color and cell structure in contrast to the non-uniform color and cell structure of the interior of the foam molding of Example 1. Relative to the cell size distribution in the interior of the foam molding of Example 1 the distribution of cell sizes in the interior of the foam molding of Example 2 appears to be narrow. The free blown foam of Example 2 exhibited a uniform color throughout as compared to the non-uniform color of the free blown foam of Example 1.

EXAMPLE 3

A polyisocyanate composition at about 97° F having a free isocyanate content of 25.4 percent by weight and a viscosity of 4,925 cps at 70° F prepared by reacting Voranol P400 (a poly(oxypropylene) diol having an average molecular weight of about 400 and a hydroxyl number of about 270.3, obtainable from the Dow Chemical Co.) with Mondur MR (a polyisocyanate having a free isocyanate content of 31.23 percent by weight obtainable from the Mobay Chemical Co.) and a polyol mixture at about 68° F comprising 83.9 parts by weight of Poly G–435DM (a propylene oxide - methyl glucoside adduct, propylene oxide-glycerine adduct mixture having a hydroxyl number of 435.3, obtainable from the Olin Mathieson Chemical Co.), 12.32 parts by weight of monofluorotrichloromethane, 1.50 parts by weight of Dow Corning 193 surfactant (a silicone-glycol copolymer obtainable from the Dow Corning Corp.), 1.68 parts by weight of difluorodichloromethane, and 0.6 parts by weight of N, N, N′, N′ tetramethyl-1,3-butane diamine at 53.1/46.9 polyisocyanate composition/polyol mixture ratio by weight were injected into the mixing chamber of a Martin Sweets foam machine (Model VII pumping and metering unit, size 4 MH4FPG mixing head), said mixing chamber being of the type described in Example 1, operating at an impeller speed of 5,300 rpm, said impeller being of the type described in Example 1 and to be known as the reverse spiral impeller, by means of constant displacement pumps operating at a combined output of 20.4 lbs/min. The liquid stream discharged from the mixing chamber was passed into a 166 in³ closed aluminum mold at about a mold temperature of 135° F or into a 32 oz. paper cup. The approximately 900 grams of material passed into the aluminum mold was allowed to foam and cure whereupon the resultant article was removed. The material which passed into the paper cup was permitted to foam freely and the resultant foam examined. The article removed from the mold exhibited a non-uniform surface color which comprised areas of relatively light tan color and randomly distributed areas, of random size, having a darker (i.e., brown) color. The relatively light tan areas exhibited a uniform cell structure composed of relatively small diameter cells (i.e., the distribution of cell sizes was narrow and the average cell size being relatively small) while the darker colored isocyanate rich-looking areas exhibited a non-uniform cell structure having an average cell diameter which was relatively large (i.e., the distribution of cell sizes was wide and the average cell diameter relatively large). Non-uniform color and cell structure was obtained in the core foam of the molding. The core foam of the molding contained regions of very light color and randomly distributed darker colored isocyanate rich-looking regions. Cell structure was uniform in the light colored regions and the average cell diameter relatively small, while in the darker colored regions the cell structure was non-uniform and the average cell diameter relatively large (i.e., the distribution of cell sizes was wide and the average cell diameter relatively large). Non-uniform color and cell structure was obtained in the free blown foam. Relatively dark colored isocyanate rich-looking regions having a non-uniform cell structure and a relatively large average cell diameter were distributed randomly throughout the bulk of the free blown foam. The very light colored regions of the free blown foam exhibited a uniform cell structure having a relatively small average cell diameter.

EXAMPLE 4

A polyisocyanate composition at about 99° F having a free isocyanate content of 25.64 percent by weight of a viscosity of 6,550 cps at 70° F prepared by reacting Voranol P400 (a poly(oxypropylene) diol having an average molecular weight of about 400 and a hydroxyl number of about 270.3, obtainable from the Dow Chemical Co.) with Mondur MR (a polyisocyanate having a free isocyanate content of about 31.28 percent, obtainable from the Mobay Chemical Co.) and the polyol mixture of Example 3 at about 68° F at a 52.7/47.3 polyisocyanate composition/polyol mixture ratio by weight were injected into the mixing chamber of Example 3 of the Martin Sweets foam machine of Example 3, modified to include a 60 × 60 mesh (60 openings per inch) wire screen at the entire internal periphery of the impeller basket of the impeller of Example 3, by means of constant displacement pumps operating at a combined output of 20.6 lbs/min. The impeller of the mixing chamber was operated at 5,300 rpm. Approximately 900 grams of the liquid stream being discharged from the mixing chamber was directed into a 166 in³ closed aluminum mold at a mold temperature of 132° F. The liquid in the mold was permitted to foam and the resulting foam article cured in the mold. A foam molding was obtained which exhibited a slight non-uniformity of surface color only at one corner. The remaining surface comprising 95 percent of the entire molding, exhibited uniform color and uniform cell structure as opposed to the general non-uniform color and cell structure obtained on the surface of the molding of Example 3. The core foam of the resulting molding exhibited a uniform very light color and a uniform cell structure, as opposed to the nonuniform color and cell structure obtained in the core foam of the molding of Example 3.

What is claimed is:

1. A process for forming mixtures of liquids, at least two of which are mutually co-reactive liquids wherein the mutually co-reactive liquids comprise (1) at least one organic polyisocyanate or an isocyanate-terminated reaction product resulting from the reaction of an organic polyisocyanate or mixture of organic polyisocyanates with an organic polyhydroxy compound or mixtures of organic polyhydroxy compounds and (2) at least one organic polyhydroxy compound, comprising the steps of:
   a. separately charging each liquid to be mixed to a cavity defined by rotating vertical walls having a plurality of holes each having a maximum cross sectional dimension, excluding their longitudinal dimension, of 0.001 to 0.033 inch,
   b. causing the liquid to pass through said holes under the influence of centrifugal force and then
   c. immediately subjecting the partially mixed liquids from step (b) to a shearing action.

2. The process of claim 1 wherein (1) at least one organic polyisocyanate or an isocyanate-terminated reaction product resulting from the reaction of an organic polyisocyanate or mixtures of organic polyisocyanates with an organic polyhydroxy compound or a mixture of organic polyhydroxy compounds and (2) at least one organic polyhydroxy compound are admixed with any or all of the following:
   blowing agents
   surfactant
   catalyst
   fillers
   pigments
   fire retardant additives
   U.V. stabilizers
   antioxidants 3. The process of claim 1 wherein (1) at least one organic polyisocyanate or isocyanate-terminated reaction product resulting from the reaction of an organic polyisocyanate or mixtures of organic polyisocyanates with an organic polyhydroxy compound or mixtures of organic polyhydroxy compounds or (2) at least one organic polyhydroxy compound are admixed with any or all of the following:
blowing agents
surfactant
catalyst
fillers
pigments
fire retardant additives
U.V. stabilizers
antioxidants 4. The process of claim 2 whereby a polyurethane foam is produced.

5. The process of claim 3 whereby a polyurethane foam is produced.

6. The process of claim 1 wherein the plurality of holes are the spaces between the wires of a woven screen having a mesh of 20 to 400 per inch.

7. The process of claim 1 wherein the mutually co-reactive liquids comprise (1) an organic polyisocyanate or mixture of organic polyisocyanates and (2) a hydroxy-terminated reaction prodiuct obtained by the reaction of an organic polyhydroxy compound or mixture of organic polyhydroxy compounds with an organic polyisocyanate or mixture of organic polyisocyanates.

8. The process of claim 7 wherein (1) an organic polyisocyanate or mixture of organic polyisocyanates and (2) an hydroxy-terminated reaction product obtained by the reaction of an organic polyhydroxy compound or mixture of organic polyhydroxy compounds with an organic polyisocyanate or mixture of organic polyisocyanates are admixed with any or all of the following:
blowing agents
surfactant
catalyst
fillers
pigments
fire-retardant additives
U.V. stabilizers
antioxidants 9. The process of claim 7 wherein (1) an organic polyisocyanate or mixture of organic polyisocyanates or (2) a hydroxy-terminated reaction product obtained by the reaction of an organic polyhydroxy compound or mixture of organic polyhydroxy compounds with an organic polyisocyanate or mixture of organic polyisocyanates are admixed with any or all of the following:
blowing agents
surfactant
catalyst
fillers
pigments
fire-retardant additives
U.V. stabilizers
antioxidants 10. The process of claim 8 whereby a polyurethane foam is produced.

11. The process of claim 9 whereby a polyurethane foam is produced.

12. The process of claim 7 wherein the plurality of holes are the spaces between the wires of a woven screen having a mesh of 20 to 400 per inch.

* * * * *